United States Patent [19]
Ogata

[11] Patent Number: 4,607,918
[45] Date of Patent: Aug. 26, 1986

[54] ZOOM LENS SYSTEM
[75] Inventor: Yasuzi Ogata, Tokyo, Japan
[73] Assignee: Olympus Optical Co., Ltd., Tokyo, Japan
[21] Appl. No.: 572,452
[22] Filed: Jan. 20, 1984
[30] Foreign Application Priority Data
  Feb. 2, 1983 [JP] Japan ............... 58-14602
[51] Int. Cl.⁴ .............. G02B 15/177; G02B 15/14
[52] U.S. Cl. ....................................... 350/426
[58] Field of Search ......................... 350/426, 423
[56] References Cited
  U.S. PATENT DOCUMENTS
  4,074,931  2/1978  Okudaira ...................... 350/426
  4,304,466  12/1981  Betensky ...................... 350/426
  4,364,641  12/1982  Mogami ....................... 350/426
  4,477,153  10/1984  Suda et al. ................... 350/426

FOREIGN PATENT DOCUMENTS
  49-2548  1/1974  Japan .
  52-153752  12/1977  Japan .
  53-132360  11/1978  Japan .
  55-19022  4/1980  Japan .
  55-77712  6/1980  Japan ........................... 350/426
  56-19022  2/1981  Japan .

*Primary Examiner*—John K. Corbin
*Assistant Examiner*—Scott J. Sugarman
*Attorney, Agent, or Firm*—Cushman, Darby & Cushman

[57] ABSTRACT

A zoom lens system having a large relative aperture, an F number of 2.8 over the entire zooming range, and favorably corrected paraxial and offaxial aberrations comprising a front lens group having negative refractive power and a rear lens group having positive refractive power and so designed as to change magnification levels by varying an airspace between said front and rear lens groups, said rear lens group comprising at least two positive lens components, a negative lens component, a positive lens component and a negative lens component.

8 Claims, 5 Drawing Figures

ZOOM LENS SYSTEM

BACKGROUND OF THE INVENTION (a) Field of the Invention:

The present invention relates to a large relative aperture zoom lens system having focal length on the order of 35 mm to 70 mm for use with 35 mm single reflex cameras.

(b) Description of the Prior Art:

Out of zoom lens systems, there is known a type comprising two lens groups, i.e., a front diverging lens group and a rear converging lens group. This type of zoom lens system comprising the two lens groups are suited as a wide-angle zoom lens systems having zooming ratios on the order of 2 since it comprises a stop in the rear lens group, thereby permitting limiting within a relatively narrow range the variation of distortion, known as a defect of zoom lens systems comprising four lens groups, and shortening total length of the lens system.

For this reason, researches have recently been made on the zoom lens systems comprising two lens groups, making rapid progress and providing numerous known examples of zoom lens systems compsiting two lens groups. However, it is rather difficult to impart large relative apertures to the lens systems compsiting two lens groups and most of the conventional examples had F numbers of 3.5 at largest. For example, the zoom lens systems disclosed by Japanese Unexamined Published patent application Nos. 2548/74, 132360/78, 19022/81 and 153752/77, which are of a different lens type from the zoom lens system according to the present invention, had an F number of 3.5 and small relative apertures. Further, as a zoom lens system having a composition consisting of 7 components of 7 elements similar to that of the zoom lens system according to the present invention, there has already been known the one disclosed by Japanese Examined Published Patent Application No. 13334/80. However, this zoom lens system has low performance.

The impossibility to obtain a zoom lens system having a large relative aperture is attributed to the basic composition of the zoom lens systems that they comprise a front diverging lens group. Speaking concretely, the rays strongly diverged by the front lens group remarkably enlarge relative aperture of the rear lens group at the stage of incidence on the latter. Accordingly, undercorrected spherical aberration is produced especially at the tele position of the zoom lens systems. When this spherical aberration is corrected by a triplet type of rear lens group in the manner adopted in the conventional zoom lens systems, the image side surface of the negative lens component arranged in the triplet type of lens group has too strong power, thereby curving astigmatism characteristic at the wide position and degrading image plane characteristic. In addition, it aggravates flare due to coma. These disadvantages degrade performance of the zoom lens systems and image contrast.

SUMMARY OF THE INVENTION

A general object of the present invention is to provide a zoom lens system having an F number of 2.8 over the entire zooming range, favorably corrected aberrations and a large relative aperture comprising a front lens group and a rear lens group wherein spherical aberration and flare are corrected favorably by arranging, on the image side of said rear lens group, a negative lens component having an object side surface whose center of curvature is located in the vicinity of the stop.

The zoom lens system according to the present invention comprises a front diverging lens group and a rear converging lens group, said rear lens group comprising at least two positive lens components, a negative lens component having a surface with strong curvature on the image side, a positive lens component and a negative lens component having a surface with strong curvature on the object side. By arranging the two negative lens components in the rear lens group as described above, the function to prevent spherical aberration in the rear lens group is imparted to these negative lens components and power of the diverging surfaces of these negative lens components are prevented from being too strong. In this case, however, height of incidence and angle of incidence of offaxial rays are too large on the negative lens component arranged on the extreme image side, thereby producing flare due to coma. In order to prevent the flare due to coma from being produced, the object side surface of the negative lens component arranged on the extreme image side is so designed as to have the center of curvature in the vicinity of the stop so that it has lower refractive function for the offaxial rays. This means makes it possible to correct favorably both paraxial and offaxial aberrations regardless of the large regative aperture, i.e., F number of 2.8 over the entire zooming range.

In the zoom lens system having the composition described above, aberrations can be corrected more favorably by designing it so as to satisfy the following conditions (1) and (2) wherein the reference symbol $f_R$ represents focal length of said rear lens group, the reference symbol $\phi_a$ designates power of the image side surface of the negative lens component arranged on the object side in said rear lens group and the reference symbol $\phi_b$ denotes power of the object side surface of the negative lens component arranged on the image side in said rear lens group.

$$0.75 < |\phi_a| f_R < 1.0 \tag{1}$$

$$0.6 < |\phi_b| f_R < 1.2 \tag{2}$$

The powers $\phi$ ($\phi_a$ and $\phi_b$) of the lens surfaces are values expressed as $$\phi = \frac{1}{r} \cdot \frac{n' - n}{n'}$$

when radius of curvature of lens syrface is represented by r, and refractive indices before and after lens surface are designated by n and n' respectively.

By designing the rear lens group so as to have the composition described above, it is possible to obtain a zoom lens system accomplishing the object of the present invention.

A front lens group to be combined with the abovedescribed rear lens group is composed of a negative meniscus lens component having a surface with a small radius of curvature on the image side, a biconcave lens component, and a positive lens component, and should desirably satisfy the following conditions (3) through (6):

$$1.0 < |f_F|/f_T < 1.3 \tag{3}$$

$$1.1 < \phi_c \cdot f_F < 1.3 \tag{4}$$

$$\nu_1 < 35 \qquad (5)$$

(6) At least one of the two or more positive lens components arranged on the object side in said rear lens group has an Abbe's number of 60 or large.

wherein the reference symbol $f_F$ represents focal length of said front lens group, the reference symbol $f_T$ designates focal length of the zoom lens system as a whole at its tele position, the reference symbol $\nu_1$ denotes Abbe's number of the negative lens component (negative meniscus lens component) arranged on the object side in said front lens group and the reference symbol $\phi_c$ represents power of the image side surface of said negative lens component.

Now, significance of the above-mentioned conditions (1) through (6) will be described detailedly below.

Both the conditions (1) and (2) are adopted for correcting spherical aberration especially at the tele position of the zoom lens system. When spherical aberration is corrected only with the image side surface of the negative lens component arranged on the object side in the rear lens group, power of this surface is too strong as already described, thereby aggravating astigmatism and remarkably curving coma characteristic. In the zoom lens system according to the present invention, a nagative lens component is additionally arranged on the extreme image side in the lens system to correct spherical aberration also with the object side surface of said negative lens component.

The conditions (1) and (2) define powers $\phi_a$ and $\phi_b$ of the image side surface of the negative lens component arranged on the object side and the object side surface of the negative lens component arranged on the extreme image side respectively in said rear lens group. If the power $\phi_a$ is strong enough to exceed the upper limit of the condition (1), astigmatism will be produced and coma characteristic will be remarkably curved, thereby allowing flare due to coma to be produced. If the power $\phi_a$ is weak enough to exceed the lower limit of the condition (1), in contrast, spherical aberration will not be corrected sufficiently. The offaxial rays are incident relatively high on the negative lens component arranged on the extreme image side. Therefore, the power $\phi_b$ of the object side surface of this negative lens component will be too strong if it is determined for the purpose of correcting spherical aberration only. In such a case, astigmatism and flare due to coma may be produced similarly to the case where the power $\phi_a$ is too strong. Further, the function to correct spherical aberration will be too low when the power $\phi_b$ is weak. For this reason, this lens surface is designed as a spherical surface having center of curvature in the vicinity of the stop so that angle of incidence of the offaxial rays will not be large on this surface. In addition, the condition (2) has been set up so as to assure an adequate balance between correction of spherical aberration and correction of aberrations by the offaxial rays.

If the object side surface of the negative lens component has power weaker than the lower limit of the condition (2), the function to correct spherical aberration will be too low for correcting it sufficiently. If the upper limit of the condition (2) is exceeded, in contrast, astigmatism and coma will be produced.

The condition (3) defines basic composition of the lens system according to the present invention in the paraxial theory. If the front lens group has power weak enough to exceed the upper limit of the condition (3), it is advantageous for correcting aberrations since it permits lowering the imaging magnification of the rear lens group. However, such weak power of the front lens group will prolong total length of the lens system, require a longer displacement of the front lens group for focusing the lens system on an object located at a short distance and increase eclipse of the lower rays at the wide position, thereby making it difficult to reserve sufficient quantity of marginal rays. If the lower limit of the condition (3) is exceeded, in contrast, the front lens group will have strong power, cuasing power of the rear lens group to be increased and aggravating aberrations accordingly.

The condition (4) has been adopted to correct astigmatism and distortion. If the image side surface of the negative lens component arranged in the front lens group has power strong enough to exceed the upper limit of the condition (4), astigmatism will be undercorrected and the image plane characteristic will be degraded. If this lens surface has power weak enough to exceed the lower limit of the condition (4), in contrast, barrel distortion will be remarkable at the wide position and uncorrectable with the other lens surfaces.

In this type of lens systems, flare due to coma produced by the g-line of the lower rays is apt to be undercorrected when longitudinal chromatic aberration and lateral chromatic aberration are corrected favorably. This is attributable to the fact that chromatic aberration of coma is produced to different degrees at different wavelengths in the front lens group though coma (chromatic aberration of coma) is produced to the same degree at different wavelengths in the rear lens group. As a result, the coma produced by the g-line in the front lens group is apt to be overcorrected. It is necessary to correct the chromatic aberration of coma by correcting the coma produced by the g-line rather insufficiently. The condition (5) has been adopted for this purpose.

Further, on the negative lens component arranged on the object side, the lower rays are incident highest and subjected to strong diverging function. Therefore, Abbe's number $\nu_1$ of this negative lens component is selected at a small value as defined by the condition (5) to diverge the lower rays of the g-line more strongly.

If the condition (5) is not satisfied, it will be impossible to correct chromatic aberration of coma in the entire lens system. Furthermore, chromatic aberration in zoom lens systems is varied remarkably by zooming and the variation must be prevented. This variation is apt to be caused especially by the positive lens component arranged on the object side in the rear lens group. In view of this fact, the variation is prevented by designing the lens system according to the present invention so as to satisfy the condition (6), i.e., by selecting a large Abbe's number for at least one of the two or more positive lens components arranged on the object side in the rear lens group. If the condition (6) is not satisfied, variation of chromatic aberration will be undesirably remarkable.

DETAILED DESCRIPTION OF THE PREFERRED EMBODIMENTS

Now, some preferred embodiments of the zoom lens system according to the present invention will be described detailedly below:

Embodiment 1 f = 36~67.9 F/2.8

$r_1 = 75.212$
$d_1 = 2.27$  $n_1 = 1.71736$  $\nu_1 = 29.51$
$r_2 = 28.319$
$d_2 = 9.57$
$r_3 = -166.359$
$d_3 = 1.61$  $n_2 = 1.77251$  $\nu_2 = 49.66$
$r_4 = 100.970$
$d_4 = 2.72$
$r_5 = 52.881$
$d_5 = 5.56$  $n_3 = 1.78471$  $\nu_3 = 26.22$
$r_6 = 883.234$
$d_6 = 51.81 \sim 0.97$
$r_7 = 102.616$
$d_7 = 4.06$  $n_4 = 1.61700$  $\nu_4 = 62.79$
$r_8 = -110.285$
$d_8 = 0.10$
$r_9 = 25.653$
$d_9 = 6.85$  $n_5 = 1.62299$  $\nu_5 = 58.14$
$r_{10} = 308.903$
$d_{10} = 5.81$
$r_{11} = -71.429$
$d_{11} = 5.92$  $n_6 = 1.71736$  $\nu_6 = 29.51$
$r_{12} = 23.314$
$d_{12} = 4.00$
$r_{13} = 110.651$
$d_{13} = 7.99$  $n_7 = 1.71300$  $\nu_7 = 53.84$
$r_{14} = -23.289$
$d_{14} = 1.27$
$r_{15} = -21.858$
$d_{15} = 1.50$  $n_8 = 1.74400$  $\nu_8 = 44.73$
$r_{16} = -40.239$ $f_F = -80.754, f_R = 48.248$
$|\phi_a|f_R = 0.86, |\phi_b|f_R = 0.94$
$\phi_c \cdot f_F = 1.19$

Embodiment 2 f = 36~67.9, F/2.8

$r_1 = 95.636$
$d_1 = 2.37$  $n_1 = 1.78470$  $\nu_1 = 26.22$
$r_2 = 30.107$
$d_2 = 11.30$
$r_3 = -96.301$
$d_3 = 1.71$  $n_2 = 1.77250$  $\nu_2 = 49.66$
$r_4 = 117.179$
$d_4 = 2.48$
$r_5 = 65.123$
$d_5 = 6.40$  $n_3 = 1.78470$  $\nu_3 = 26.22$
$r_6 = -159.522$
$d_6 = 51.77 \sim 1.05$
$r_7 = 135.394$
$d_7 = 3.70$  $n_4 = 1.48750$  $\nu_4 = 70.15$
$r_8 = -101.971$
$d_8 = 0.10$
$r_9 = 25.660$
$d_9 = 6.85$  $n_5 = 1.51633$  $\nu_5 = 64.15$
$r_{10} = 104.695$
$d_{10} = 0.10$
$r_{11} = 39.143$
$d_{11} = 4.50$  $n_6 = 1.48750$  $\nu_6 = 70.15$
$r_{12} = 106.690$
$d_{12} = 5.76$
$r_{13} = -67.737$
$d_{13} = 5.66$  $n_7 = 1.71736$  $\nu_7 = 29.51$
$r_{14} = 23.237$
$d_{14} = 3.17$

-continued
Embodiment 2

$r_{15} = 65.718$
$d_{15} = 7.49$  $n_8 = 1.71300$  $\nu_8 = 53.84$
$r_{16} = -25.189$
$d_{16} = 2.21$
$r_{17} = -21.751$
$d_{17} = 1.50$  $n_9 = 1.74400$  $\nu_9 = 44.73$
$r_{18} = -42.755$ $f_F = -78.831, f_R = 49.304$
$|\phi_a|\cdot f_R = 0.89, |\phi_b|\cdot f_R = 0.97$
$\phi_c \cdot f_F = 1.15$

Embodiment 3 f = 36~67.9, F/2.8

$r_1 = 78.690$
$d_1 = 2.37$  $n_1 = 1.78472$  $\nu_1 = 25.71$
$r_2 = 28.373$
$d_2 = 11.30$
$r_3 = -87.953$
$d_3 = 1.71$  $n_2 = 1.75700$  $\nu_2 = 47.87$
$r_4 = 108.050$
$d_4 = 1.69$
$r_5 = 59.711$
$d_5 = 6.40$  $n_3 = 1.78470$  $\nu_3 = 26.22$
$r_6 = -162.087$
$d_6 = 51.43 \sim 1.51$
$r_7 = 158.847$
$d_7 = 3.70$  $n_4 = 1.51633$  $\nu_4 = 64.15$
$r_8 = -117.834$
$d_8 = 0.10$
$r_9 = 25.974$
$d_9 = 6.82$  $n_5 = 1.51633$  $\nu_5 = 64.15$
$r_{10} = 97.653$
$d_{10} = 0.10$
$r_{11} = 41.687$
$d_{11} = 4.50$  $n_6 = 1.50472$  $\nu_6 = 47.20$
$r_{12} = 147.910$
$d_{12} = 6.61$
$r_{13} = -59.973$
$d_{13} = 5.62$  $n_7 = 1.78470$  $\nu_7 = 26.22$
$r_{14} = 25.362$
$d_{14} = 2.88$
$r_{15} = 64.385$
$d_{15} = 7.48$  $n_8 = 1.77250$  $\nu_8 = 49.66$
$r_{16} = -25.689$
$d_{16} = 2.21$
$r_{17} = -21.628$
$d_{17} = 1.50$  $n_9 = 1.71301$  $\nu_9 = 53.84$
$r_{18} = -43.593$ $f_F = -78.16, f_R = 48.949$
$|\phi_a|\cdot f_R = 0.85, |\phi_b|\cdot f_R = 0.94$
$\phi_c \cdot f_F = 1.21$ wherein the reference symbols $r_1, r_2, \ldots$ represent radii of curvature on the surfaces of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, the reference symbols $\nu_1, \nu_2, \ldots$ represent Abbe's numbers of the respective lens components and the reference symbol f designates focal length of the zoom lens system as a whole.

Figure 1:
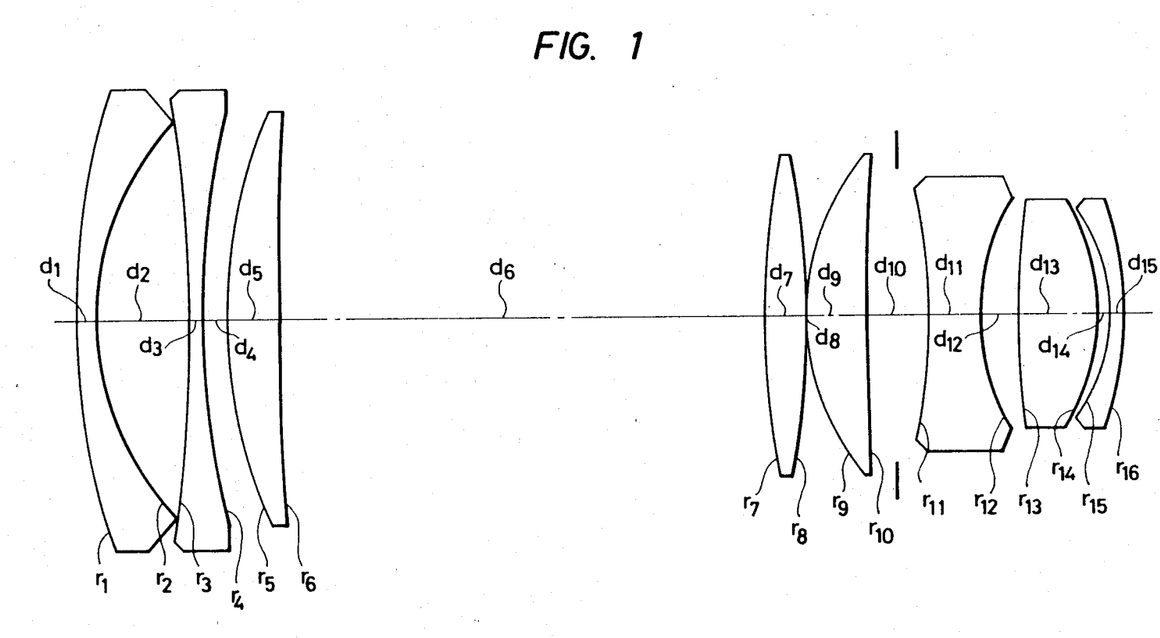
FIG. 1 shows a sectional view illustrating composition of Embodiment 1 of the zoom lens system according to the present invention.

Out of the Embodiments described above, the Embodiment 1 has the composition shown in FIG. 1 in which the rear lens group comprises two positive lens components, a negative lens component, a positive lens component and a negative lens component. In this embodiment, a stop is arranged at a point 2.8 mm on the image side as measured from the image side surface (surface $r_{10}$) of the second positive lens component arranged in the rear lens group.

Figure 2:
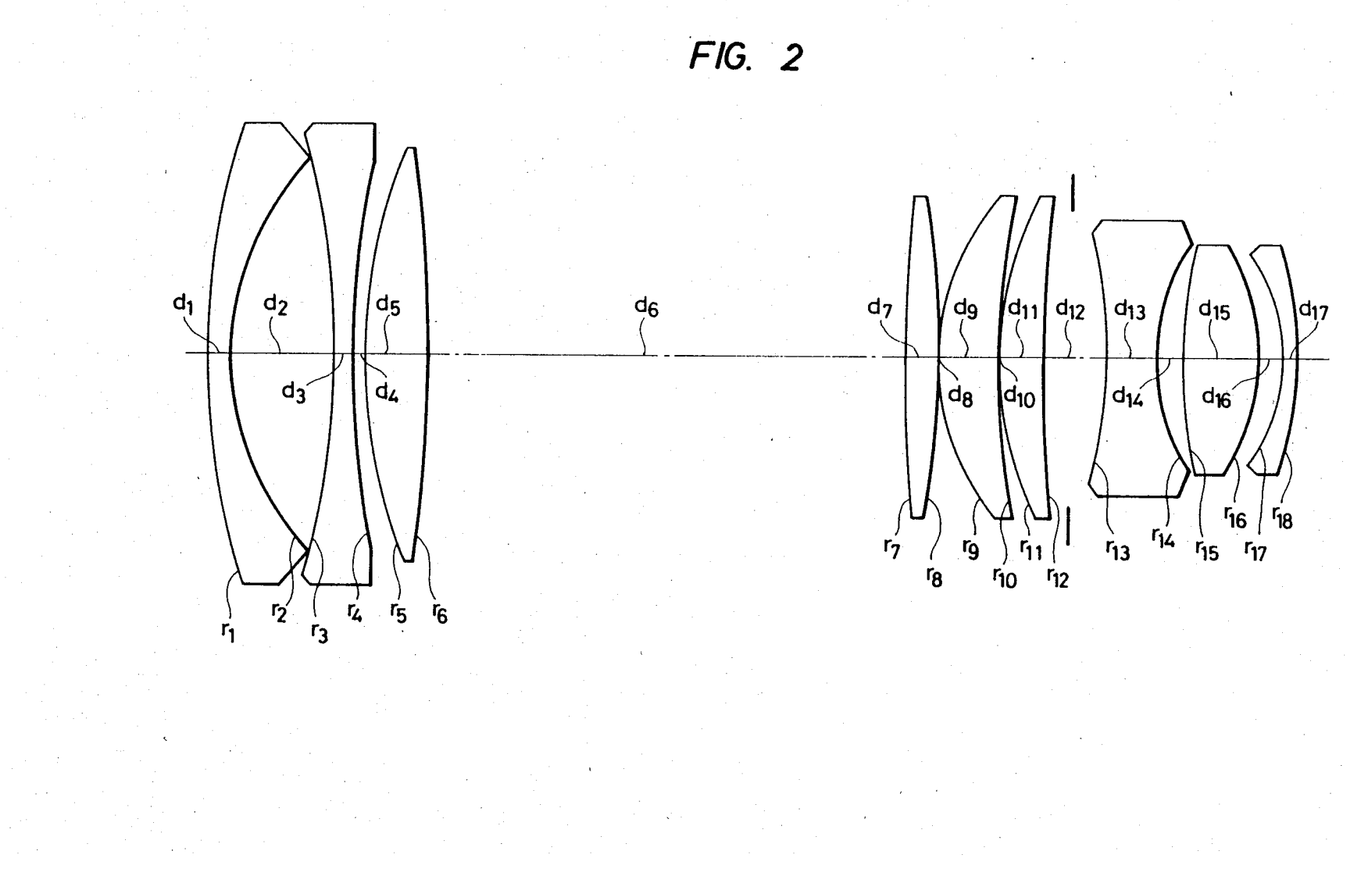
FIG. 2 shows a sectional view illustrating composition of Embodiments 2 and 3 of the present invention.

The Embodiments 2 and 3 have the composition shown in FIG. 2 in which the rear lens group comprises three positive lens components, a negative lens component, a positive lens component and a negative lens componet. In each of these embodiment, a stop is arranged at a point 2.75 mm on the image side as measured from the image side surface (surface $r_{12}$) of the third positive lens component arranged in the rear lens group.

Figure 3:
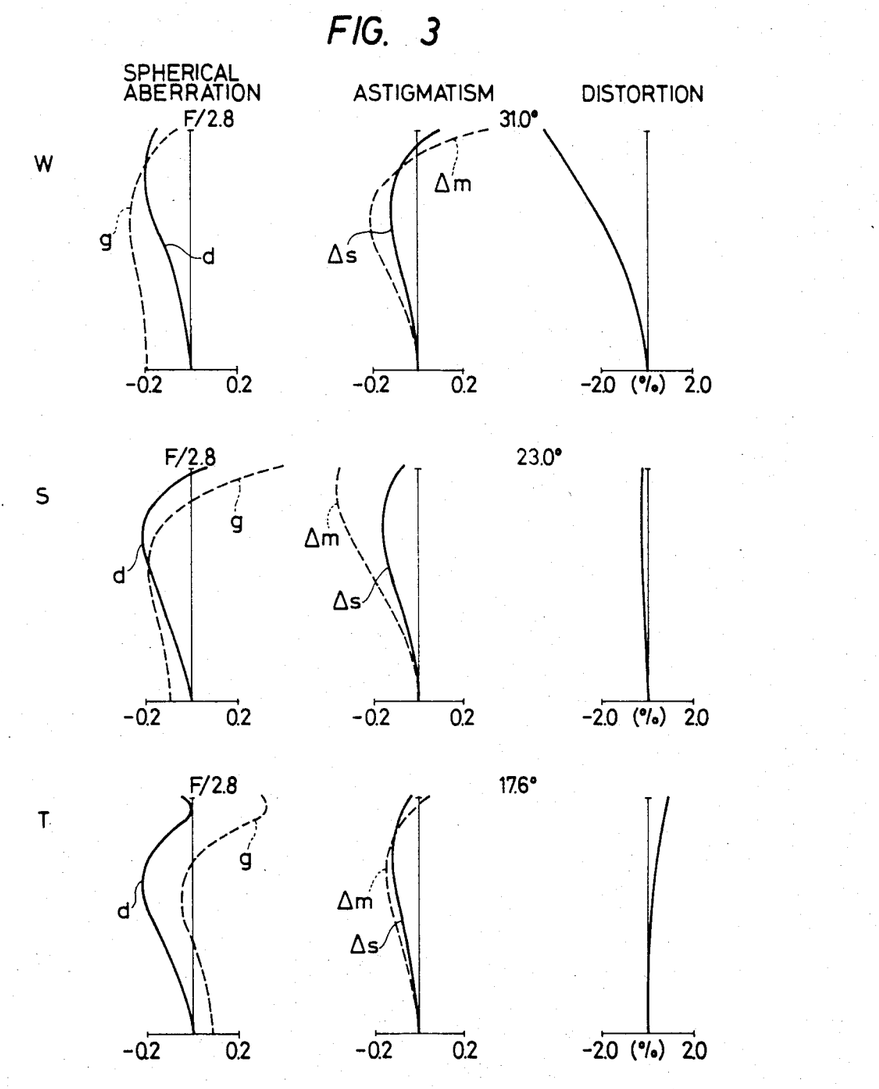
FIG. 3 through FIG. 5 show curves illustrating aberration characteristics of the Embodiments 1 through 3 of the present invention.
Figure 4:
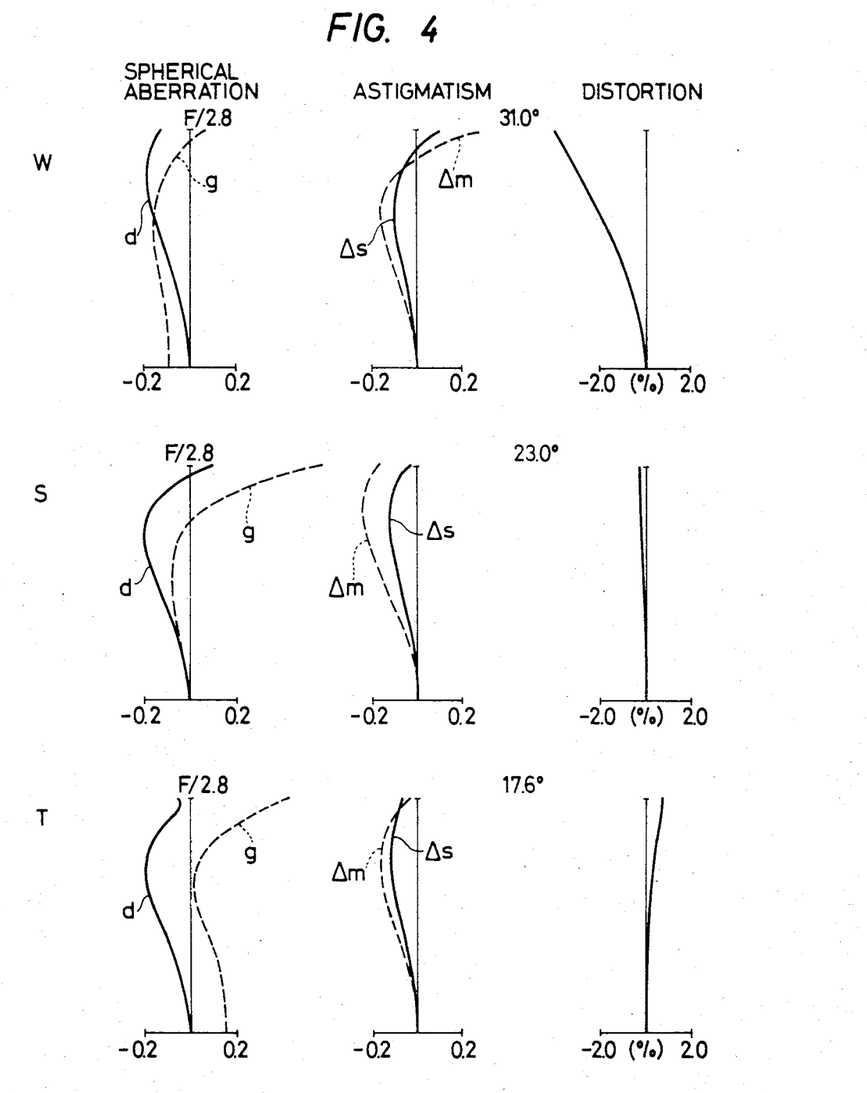
Figure 5:
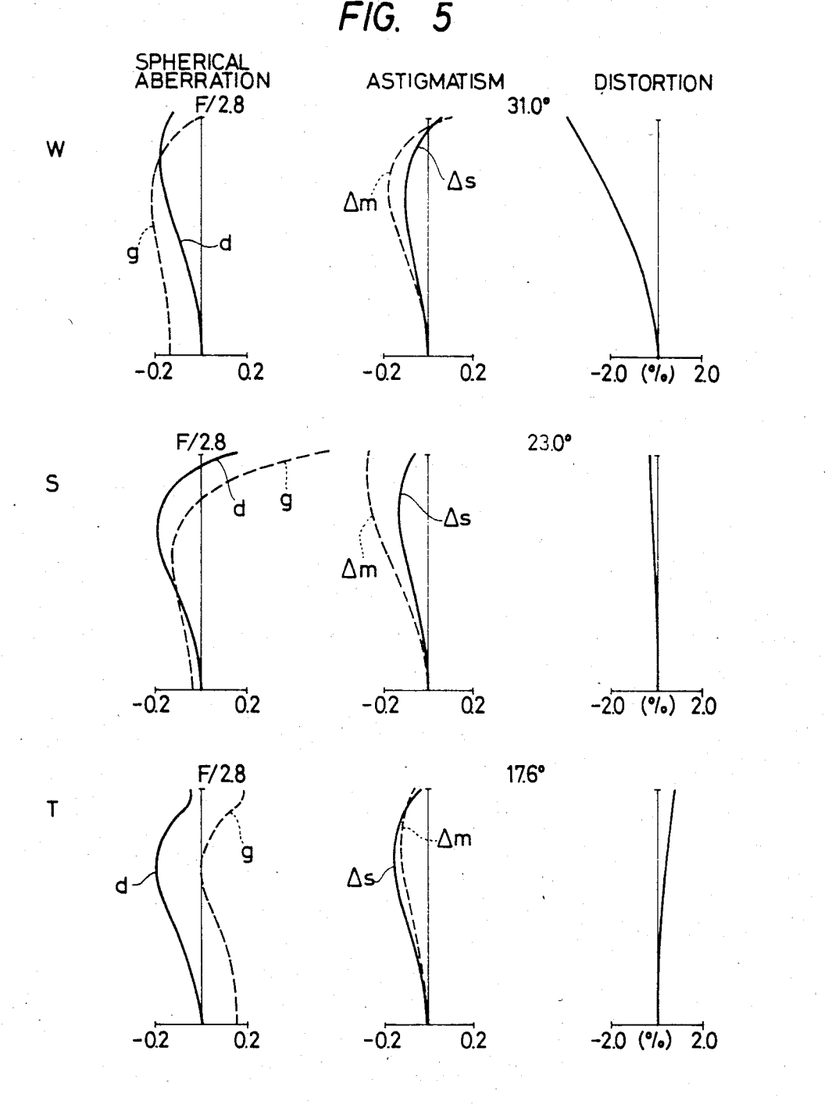

Curves illustrating aberration characteristics of these embodiments are shown in FIG. 3, FIG. 4 and FIG. 5 respectively in which the reference symbols W, S and T represent the wide position (f=36), standard position (f=51.98) and tele position (f=67.9) respectively.

As is understood from the foregoing descriptions, the zoom lens system according to the present invention has a large relative aperture of F/2.8 and favorably corrected aberrations.

I claim:

1. A large relative aperture zoom lens system comprising a front lens group having negative refractive power and a rear lens group having positive refractive power and so designed as to change magnification level by varying an airspace reserved between said front and rear lens groups, wherein said rear lens group comprises, in the sequence from the object side, at least two positive lens components, a negative lens component having a surface with a small radius of curvature on the image side, a positive lens component and a negative meniscus lens component arranged on the extreme image side therein and having a surface with a small radius of curvature on the object side, a stop being arranged before said negative lens component arranged on the object side and the object side surface of said negative lens component arranged on the extreme image side being designed as a spherical surface whose center of curvature is located in the vicinity of said stop, said larger relative aperture zoom lens system satisfying the following condition (1):

$$0.75 < |\phi_a| \cdot f_R < 1.0 \tag{1}$$

where the reference sumbol $\phi_a$ represents power of the image side surface of the negative lens component arranged on the object side in said rear lens group, and the reference symbol $f_R$ denotes focal length of said rear lens group.

2. A large relative aperture zoom lens system according to claim 1 satisfying the following condition (2):

$$0.6 < |\phi_b| \cdot f_R < 1.2 \tag{2}$$

wherein the reference symbol $\phi_b$ designates power of the object side surface of the negative lens component arranged on the image side in said rear lens group.

3. A large relative aperture zoom lens system according to claim 1 wherein said front lens group comprises a negative meniscus lens component having a surface with a small radius of curvature on the image side, a biconcave lens component and a positive lens component arranged sequentially from the object side.

4. A large relative aperture zoom lens system according to claim 2 wherein said front lens group comprises a negative meniscus lens component having a surface with a small radius of curvature on the image side, a biconcave lens component and a positive lens component arranged sequentially from the object side.

5. A large relative aperture zoom lens system according to claim 4 safisfying the following conditions (3) through (6):

$$1.0 < |f_F|/f_T < 1.3 \tag{3}$$

$$1.1 < \phi_c \cdot f_F < 1.3 \tag{4}$$

$$\nu_1 < 35 \tag{5}$$

(6) At least one of the two or more positive lens components arranged on the object side in said rear lens group has an Abbe's number of 60 or large.

wherein the reference symbol $f_F$ represents focal length of said front lens gorup, the reference symbol $f_T$ designates focal length of said zoom lens system as a whole at its tele position, the reference symbol $\phi_c$ denotes power of the image side surface of the negative lens component arranged on the object side in said front lens goup and the reference symbol $\nu_1$ represents Abbe's number of the negative lens component arranged on the object side in said front lens group.

6. A large relative aperture zoom lens system according to claim 5 comprising a rear lens group consisting of two positive lens components, a negative lens component having a surface with a small radius of curvature on the image side, a positive lens component and a negative lens component having a surface with a small radius of curvature on the object side, and having the following numerical data:

| $f = 36 \sim 67.9$, F/2.8 | | |
|---|---|---|
| $r_1 = 75.212$ | | |
| $d_1 = 2.27$ | $n_1 = 1.71736$ | $\nu_1 = 29.51$ |
| $r_2 = 28.319$ | | |
| $d_2 = 9.57$ | | |
| $r_3 = -166.359$ | | |
| $d_3 = 1.61$ | $n_2 = 1.77251$ | $\nu_2 = 49.66$ |
| $r_4 = 100.970$ | | |
| $d_4 = 2.72$ | | |
| $r_5 = 52.881$ | | |
| $d_5 = 5.56$ | $n_3 = 1.78471$ | $\nu_3 = 26.22$ |
| $r_6 = 883.234$ | | |
| $d_6 = 51.81 \sim 0.97$ | | |
| $r_7 = 102.616$ | | |
| $d_7 = 4.06$ | $n_4 = 1.61700$ | $\nu_4 = 62.79$ |
| $r_8 = -110.285$ | | |
| $d_8 = 0.10$ | | |
| $r_9 = 25.653$ | | |
| $d_9 = 6.85$ | $n_5 = 1.62299$ | $\nu_5 = 58.14$ |
| $r_{10} = 308.903$ | | |
| $d_{10} = 5.81$ | | |
| $r_{11} = -71.429$ | | |
| $d_{11} = 5.29$ | $n_6 = 1.71736$ | $\nu_6 = 29.51$ |
| $r_{12} = 23.314$ | | |
| $d_{12} = 4.00$ | | |
| $r_{13} = 110.651$ | | |
| $d_{13} = 7.99$ | $n_7 = 1.71300$ | $\nu_7 = 53.84$ |
| $r_{14} = -23.289$ | | |
| $d_{14} = 1.27$ | | |
| $r_{15} = -21.858$ | | |
| $d_{15} = 1.50$ | $n_8 = 1.74400$ | $\nu_8 = 44.73$ |
| $r_{16} = -40.239$ | | |
| $f_F = -80.754$, $f_R = 48.248$ | | |
| $|\phi_a| \cdot f_R = 0.86$, $|\phi_b| \cdot f_R = 0.94$ | | |
| $\phi_c \cdot f_F = 1.19$ | | | wherein the reference symbols $r_1, r_2, \ldots$ represent radii of curvature on the surfaces of the respective lens components, the reference symbols $d_1, d_2, \ldots$ designate thicknesses of the respective lens component, and airspaces reserved therebetween, the reference symbols $n_1, n_2, \ldots$ denote refractive indices of the respective lens components, the reference symbols $\nu_1, \nu_2, \ldots$ represent Abbe's numbers of the respective lens components and the reference symbol f designates focal length of said zoom lens system as a whole.

7. A large relative aperture zoom lens system according to claim 5 comprising a rear lens group consisting of three positive lens components, a negative lens component having a surface with a small radius of curvature on the image side, a positive lens component and a negative lens component having a surface with a small radius of curvature on the object side, and having the following numerical data:

$f = 36 \sim 67.9, F/2.8$

| | | |
|---|---|---|
| $r_1 = 95.636$ | | |
| $d_1 = 2.37$ | $n_1 = 1.78470$ | $\nu_1 = 26.22$ |
| $r_2 = 30.107$ | | |
| $d_2 = 11.30$ | | |
| $r_3 = -96.301$ | | |
| $d_3 = 1.71$ | $n_2 = 1.77250$ | $\nu_2 = 49.66$ |
| $r_4 = 117.179$ | | |
| $d_4 = 2.48$ | | |
| $r_5 = 65.123$ | | |
| $d_5 = 6.40$ | $n_3 = 1.78470$ | $\nu_3 = 26.22$ |
| $r_6 = -159.522$ | | |
| $d_6 = 51.77 \sim 1.05$ | | |
| $r_7 = 135.394$ | | |
| $d_7 = 3.70$ | $n_4 = 1.48750$ | $\nu_4 = 70.15$ |
| $r_8 = -101.971$ | | |
| $d_8 = 0.10$ | | |
| $r_9 = 25.660$ | | |
| $d_9 = 6.85$ | $n_5 = 1.51633$ | $\nu_5 = 64.15$ |
| $r_{10} = 104.695$ | | |
| $d_{10} = 0.10$ | | |
| $r_{11} = 39.143$ | | |
| $d_{11} = 4.50$ | $n_6 = 1.48750$ | $\nu_6 = 70.15$ |
| $r_{12} = 106.690$ | | |
| $d_{12} = 5.76$ | | |
| $r_{13} = -67.737$ | | |
| $d_{13} = 5.66$ | $n_7 = 1.71736$ | $\nu_7 = 29.51$ |
| $r_{14} = 23.237$ | | |
| $d_{14} = 3.17$ | | |
| $r_{15} = 65.718$ | | |
| $d_{15} = 7.49$ | $n_8 = 1.71300$ | $\nu_8 = 53.84$ |
| $r_{16} = -25.189$ | | |
| $d_{16} = 2.21$ | | |
| $r_{17} = -21.751$ | | |
| $d_{17} = 1.50$ | $n_9 = 1.74400$ | $\nu_9 = 44.73$ |
| $r_{18} = -42.755$ | | |

$f_F = -78.831, f_R = 49.304$
$|\phi_a| \cdot f_R = 0.89, |\phi_b| \cdot f_R = 0.97$
$\phi_c \cdot f_F = 1.15$ wherein the reference symbols $r_1, r_2, \ldots$ represent radii of curvature on the surfaces of the respective lens components, the reference symbls $d_1, d_2, \ldots$ designate thicknesses of the respective lens components and airspaces reserved therebetween, the reference symbols $n_1, n_2, \ldots$ denote refractive indices of the respective lens components, the reference symbols $\nu_1, \nu_2, \ldots$ represent Abbe's numbers of the respective lens components and the reference symbol f designates focal length of said zoom lens system as a whole.

8. A large relative aperture zoom lens system according to claim 5 comprising a rear lens groups consisting of three positive lens components, a negative lens component having a surface with a small radius of curvature on the image side, a positive lens component and a negative lens component having a surface with a small radius of curvature on the object side, and having the following numerical data:

$f = 36 \sim 67.9, F/2.8$

| | | |
|---|---|---|
| $r_1 = 78.690$ | | |
| $d_1 = 2.37$ | $n_1 = 1.78472$ | $\nu_1 = 25.71$ |
| $r_2 = 28.373$ | | |
| $d_2 = 11.30$ | | |
| $r_3 = -87.953$ | | |
| $d_3 = 1.71$ | $n_2 = 1.75700$ | $\nu_2 = 47.87$ |
| $r_4 = 108.050$ | | |
| $d_4 = 1.69$ | | |
| $r_5 = 59.711$ | | |
| $d_5 = 6.40$ | $n_3 = 1.78470$ | $\nu_3 = 26.22$ |
| $r_6 = -162.087$ | | |
| $d_6 = 51.43 \sim 1.51$ | | |
| $r_7 = 158.847$ | | |
| $d_7 = 3.70$ | $n_4 = 1.51633$ | $\nu_4 = 64.15$ |
| $r_8 = -117.834$ | | |
| $d_8 = 0.10$ | | |
| $r_9 = 25.974$ | | |
| $d_9 = 6.82$ | $n_5 = 1.51633$ | $\nu_5 = 64.15$ |
| $r_{10} = 97.653$ | | |
| $d_{10} = 0.10$ | | |
| $r_{11} = 41.687$ | | |
| $d_{11} = 4.50$ | $n_6 = 1.54072$ | $\nu_6 = 47.20$ |
| $r_{12} = 147.910$ | | |
| $d_{12} = 6.61$ | | |
| $r_{13} = -59.973$ | | |
| $d_{13} = 5.62$ | $n_7 = 1.78470$ | $\nu_7 = 26.22$ |
| $r_{14} = 25.362$ | | |
| $d_{14} = 2.88$ | | |
| $r_{15} = 64.385$ | | |
| $d_{15} = 7.48$ | $n_8 = 1.77250$ | $\nu_8 = 49.66$ |
| $r_{16} = -25.689$ | | |
| $d_{16} = 2.21$ | | |
| $r_{17} = -21.628$ | | |
| $d_{17} = 1.50$ | $n_9 = 1.71301$ | $\nu_9 = 53.84$ |
| $r_{18} = -43.593$ | | |

$f_F = -78.16, f_R = 48.949$
$|\phi_a| \cdot f_R = 0.85, |\phi_b| \cdot f_R = 0.94$
$\phi_c \cdot f_F = 1.21$ wherein the reference symbols $r_1, r_2, \ldots$ represent radii of curvature on the surfaces of the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, the reference symbols $\nu_1, \nu_2, \ldots$ represent Abbe's numbers of the respective lens components and the reference symbol f designates focal length of said zoom lens system as a whole.

* * * * *